United States Patent
Dash et al.

(10) Patent No.: US 7,787,978 B2
(45) Date of Patent: Aug. 31, 2010

(54) APPARATUS AND METHOD FOR CONTROLLER PERFORMANCE MONITORING IN A PROCESS CONTROL SYSTEM

(75) Inventors: Sachindra K. Dash, Scottsdale, AZ (US); Sujit V. Gaikwad, Glendale, AZ (US); Konstantinos Tsakalis, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 808 days.

(21) Appl. No.: 11/542,065

(22) Filed: Oct. 3, 2006

(65) Prior Publication Data

US 2008/0082312 A1    Apr. 3, 2008

(51) Int. Cl.
*G06F 19/00*    (2006.01)
*G06F 11/30*    (2006.01)
*G05B 13/02*    (2006.01)
*G05B 9/02*    (2006.01)
*G01R 31/00*    (2006.01)
*G01R 13/00*    (2006.01)
*G01R 29/26*    (2006.01)
*G21C 17/00*    (2006.01)

(52) U.S. Cl. .................. 700/108; 700/37; 700/81; 700/174; 702/58; 702/69; 702/185; 714/47; 324/614

(58) Field of Classification Search .......... 700/28, 700/32, 33, 37, 44, 45, 79, 81, 108, 174, 700/175, 280; 702/17, 58, 69, 182–185, 702/191, 195; 714/47, 705; 60/725; 324/613, 324/614; 340/310.13
See application file for complete search history.

(56) References Cited

U.S. PATENT DOCUMENTS 3,969,683 A * 7/1976 Fabricius ............... 330/144
5,952,563 A * 9/1999 Shiraki ................. 73/105

(Continued)

FOREIGN PATENT DOCUMENTS

JP    2005147741 A  *  6/2005

OTHER PUBLICATIONS

Kostas Tsakalis et al., "Implementation of Controller Performance Monitoring on a MIMO Example," 2006 IEEE, Proceedings of the 2006 American Control Conference, Minneapolis, Minnesota, USA, Jun. 14-16, 2006, pp. 2113-2117.

(Continued)

*Primary Examiner*—Crystal J Barnes-Bullock
(74) *Attorney, Agent, or Firm*—Munck Carter, LLP

(57) ABSTRACT

An apparatus, method, and computer program are provided for controller performance monitoring in a process control system. A level of disturbance associated with the process system is determined, and at least one value identifying a stability measure of a controller in the process system is determined using the determined level of disturbance and operating data associated with operation of the process system. The at least one value is compared to at least one threshold value, and a problem with the controller is identified based on the comparison. As an example, the process system could represent a product production system. Also, the operating data could include at least one of: measurement data from one or more sensors and control data for one or more actuators. The controller may be operable to receive the measurement data and generate the control data.

20 Claims, 3 Drawing Sheets

U.S. PATENT DOCUMENTS

| | | | |
|---|---|---|---|
| 6,088,407 A * | 7/2000 | Buternowsky et al. | 375/347 |
| 6,094,602 A * | 7/2000 | Schade, III | 700/45 |
| 6,216,063 B1 | 4/2001 | Lind et al. | |
| 6,510,393 B1 * | 1/2003 | Steinigke | 702/58 |
| 6,805,633 B2 * | 10/2004 | Hein et al. | 463/35 |
| 6,826,372 B1 * | 11/2004 | Givehchi | 398/209 |
| 7,188,701 B2 * | 3/2007 | Patankar | 180/446 |
| 7,253,987 B1 * | 8/2007 | Shim et al. | 360/77.02 |
| 7,328,081 B2 * | 2/2008 | Kluft | 700/175 |
| 7,418,469 B2 * | 8/2008 | Nikitin | 708/819 |
| 2001/0021987 A1 * | 9/2001 | Govindarajan et al. | 714/705 |
| 2003/0199997 A1 * | 10/2003 | Gao | 700/18 |
| 2005/0113744 A1 * | 5/2005 | Donoghue et al. | 604/66 |
| 2005/0159913 A1 * | 7/2005 | Ariyoshi et al. | 702/122 |
| 2005/0284160 A1 | 12/2005 | Singhal et al. | |
| 2007/0076896 A1 * | 4/2007 | Hosaka et al. | 381/71.11 |
| 2007/0225835 A1 * | 9/2007 | Zhu | 700/44 |

OTHER PUBLICATIONS

Kostas S. Tsakalis et al., "Simple Criteria for Controller Performance Monitoring," 2002 AACC, Proceedings of the American Control Conference, Anchorage, AK, May 8-10, 2002, pp. 4985-4987.

Ehsan Al-Dulaijan et al., "Multivariable Controller Performance Monitoring via Robust Stability Conditions," Proceedings IEEE APC 2001 Workshop, Industry Appl. Society, May 8-10, 2001, 6 pages.

* cited by examiner

APPARATUS AND METHOD FOR CONTROLLER PERFORMANCE MONITORING IN A PROCESS CONTROL SYSTEM

TECHNICAL FIELD

This disclosure relates generally to control systems and more specifically to an apparatus and method for controller performance monitoring in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

In recent years, more advanced and complex controllers, such as multivariable controllers, have been introduced and used in process control systems. These more advanced controllers are often useful in coping with various trends in the process control industry, such as tighter product specifications, improved quality, and reduced waste. However, the performance of these controllers often degrades over time due to process or other changes. As a result, it is often desirable to engage in controller performance monitoring, where the performance of a controller is monitored to determine if and when the controller requires maintenance (such as re-tuning). Unfortunately, controller performance monitoring is often a difficult task due to various reasons, such as disturbances and noise in the processes being monitored and controlled.

SUMMARY

This disclosure provides an apparatus and method for controller performance monitoring in a process control system.

In a first embodiment, an apparatus includes at least one memory operable to store operating data associated with operation of a process system. The apparatus also includes at least one processor operable to determine a level of disturbance associated with the process system. The at least one processor is also operable to determine at least one value identifying a stability measure of a controller in the process system using the determined level of disturbance and the operating data. The at least one processor is further operable to compare the at least one value to at least one threshold value and identify a problem with the controller based on the comparison.

In particular embodiments, the at least one value identifying the stability measure of the controller is based on at least one of: an output signal generated by the controller, an input signal received by the controller, and an uncertainty estimate associated with the process model.

In other particular embodiments, the at least one processor is operable to identify the problem with the controller (i) without requiring injection of external excitation in the process system, (ii) even when an actuator controlled by the controller is saturated, or (iii) even when the controller was not used to generate system identification data (which was used to generate a process model representing at least a portion of the process system).

In a second embodiment, a method includes determining a level of disturbance associated with a process system. The method also includes determining at least one value identifying a stability measure of a controller in the process system using the determined level of disturbance and operating data associated with operation of the process system. The method further includes comparing the at least one value to at least one threshold value and identifying a problem with the controller based on the comparison.

In a third embodiment, a computer program is embodied on a computer readable medium and is operable to be executed by a processor. The computer program includes computer readable program code for determining a level of disturbance associated with a process system. The computer program also includes computer readable program code for determining at least one value identifying a stability measure of a controller in the process system using the determined level of disturbance and operating data associated with operation of the process system. In addition, the computer program includes computer readable program code for comparing the at least one value to at least one threshold value and identifying a problem with the controller based on the comparison.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
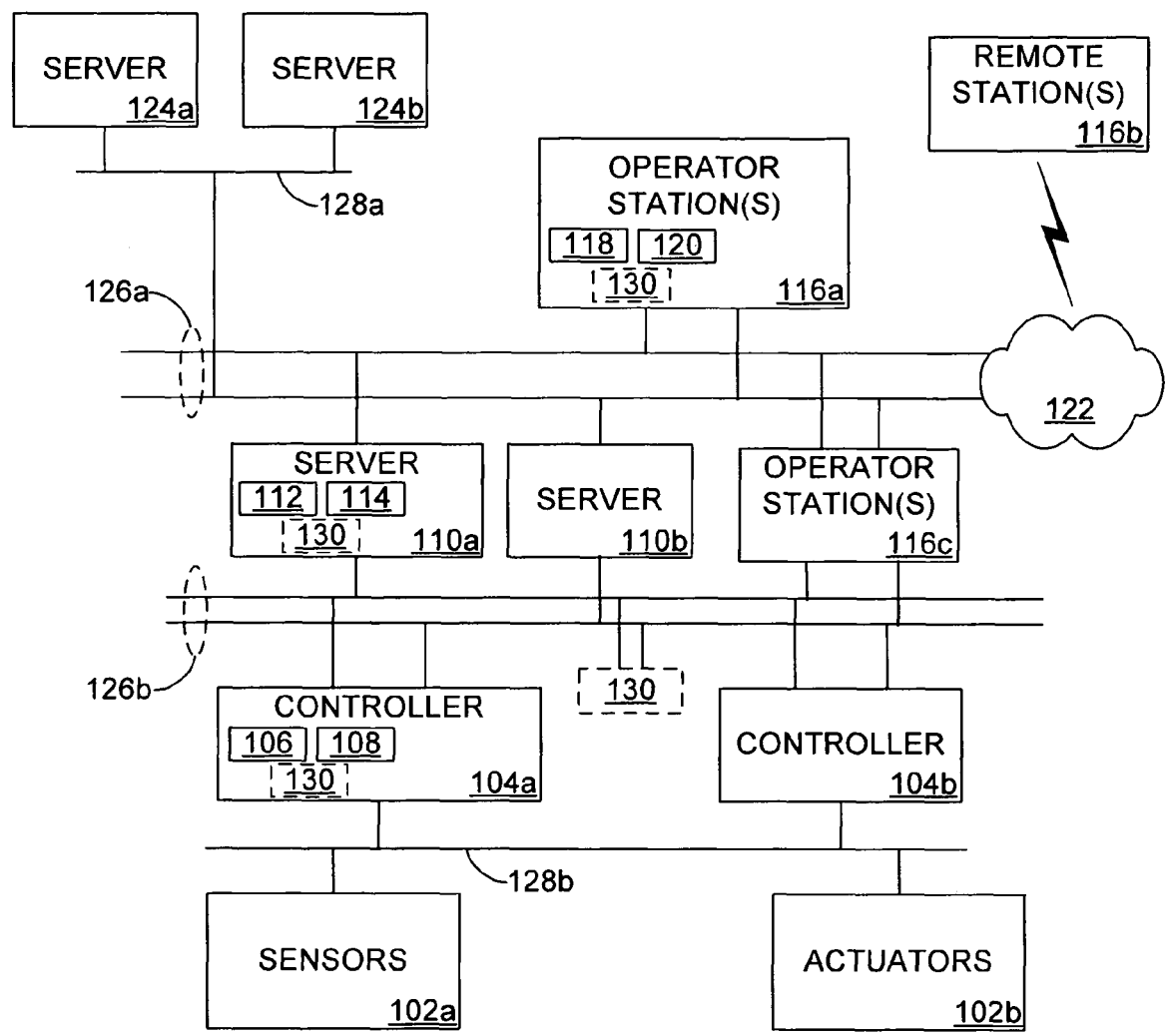
FIG. 1 illustrates an example process control system.

FIG. 1 illustrates an example process control system 100. The embodiment of the process control system 100 shown in FIG. 1 is for illustration only. Other embodiments of the process control system 100 may be used without departing from the scope of this disclosure.

In this example embodiment, the process control system 100 includes various process elements that facilitate production of at least one product, such as one or more sensors 102a and one or more actuators 102b. The sensors 102a and actuators 102b represent components in a process or production system that may perform any of a wide variety of functions. For example, the sensors 102a could measure a wide variety of characteristics in the process control system 100, such as temperature, pressure, or flow rate. As another example, the actuators 102b can perform a wide variety of operations that alter the characteristics being monitored by the sensors 102a. As particular examples, the actuators 102b could represent heaters, motors, catalytic crackers, or valves. The sensors 102a and actuators 102b could represent any other or additional components in any suitable process or production system. Each of the sensors 102a includes any suitable structure for measuring one or more characteristics in a process or production system. Each of the actuators 102b includes any suitable structure for operating on or affecting material in a process or production system.

Two controllers 104a-104b are coupled to the sensors 102a and actuators 102b. The controllers 104a-104b may, among other things, use the measurements from the sensors 102a to control the operation of the actuators 102b. For example, the controllers 104a-104b could be capable of receiving measurement data from the sensors 102a and using the measurement data to generate control signals for the actuators 102b. Each of the controllers 104a-104b includes any hardware, software, firmware, or combination thereof for interacting with the sensors 102a and controlling the actuators 102b. The controllers 104a-104b could, for example, represent multivariable controllers or other types of controllers that implement control logic (such as logic associating sensor measurement data to actuator control signals) to operate. In this example, each of the controllers 104a-104b includes one or more processors 106 and one or more memories 108 storing data and instructions used by the processor(s) 106. As a particular example, each of the controllers 104a-104b could represent a computing device running a MICROSOFT WINDOWS operating system.

Two servers 110a-110b are coupled to the controllers 104a-104b. The servers 110a-110b perform various functions to support the operation and control of the controllers 104a-104b, sensors 102a, and actuators 102b. For example, the servers 110a-110b could log information collected or generated by the sensors 102a or controllers 104a-104b, such as measurement data from the sensors 102a. The servers 110a-110b could also execute applications that control the operation of the controllers 104a-104b, thereby controlling the operation of the actuators 102b. In addition, the servers 110a-110b could provide secure access to the controllers 104a-104b. Each of the servers 110a-110b includes any hardware, software, firmware, or combination thereof for providing access to or control of the controllers 104a-104b. In this example, each of the servers 110a-110b includes one or more processors 112 and one or more memories 114 storing data and instructions used by the processor(s) 112. As a particular example, each of the servers 110a-110b could represent a computing device running a MICROSOFT WINDOWS operating system.

One or more operator stations 116a-116b are coupled to the servers 110a-110b, and one or more operator stations 116c are coupled to the controllers 104a-104b. The operator stations 116a-116b represent computing or communication devices providing user access to the servers 110a-110b, which could then provide user access to the controllers 104a-104b (and possibly the sensors 102a and actuators 102b). The operator stations 116c represent computing or communication devices providing direct user access to the controllers 104a-104b. As particular examples, the operator stations 116a-116c could allow users to review the operational history of the sensors 102a and actuators 102b using information collected by the controllers 104a-104b and/or the servers 110a-110b. The operator stations 116a-116c could also allow the users to adjust the operation of the sensors 102a, actuators 102b, controllers 104a-104b, or servers 110a-110b. Each of the operator stations 116a-116c includes any hardware, software, firmware, or combination thereof for supporting user access and control of the system 100. In this example, each of the operator stations 116a-116c includes one or more processors 118 and one or more memories 120 storing data and instructions used by the processor(s) 118. In particular embodiments, each of the operator stations 116a-116c could represent a computing device running a MICROSOFT WINDOWS operating system.

In this example, at least one of the operator stations 116b is remote from the servers 110a-110b. The remote station is coupled to the servers 110a-110b through a network 122. The network 122 facilitates communication between various components in the system 100. For example, the network 122 may communicate Internet Protocol (IP) packets, frame relay frames, Asynchronous Transfer Mode (ATM) cells, or other suitable information between network addresses. The network 122 may include one or more local area networks (LANs), metropolitan area networks (MANs), wide area networks (WANs), all or a portion of a global network such as the Internet, or any other communication system or systems at one or more locations.

In this example, the system 100 includes two additional servers 124a-124b. The servers 124a-124b execute various applications to control the overall operation of the system 100. For example, the system 100 could be used in a processing or production plant or other facility, and the servers 124a-124b could execute applications used to control the plant or other facility. As particular examples, the servers 124a-124b could execute applications such as enterprise resource planning (ERP), manufacturing execution system (MES), or any other or additional plant or process control applications. Each of the servers 124a-124b includes any hardware, software, firmware, or combination thereof for controlling the overall operation of the system 100.

As shown in FIG. 1, the system 100 includes various redundant networks 126a-126b and single networks 128a-128b that support communication between components in the system 100. Each of these networks 126a-126b, 128a-128b represents any suitable network or combination of networks facilitating communication between components in the system 100. The networks 126a-126b, 128a-128b could, for example, represent Ethernet networks, electrical signal networks (such as HART or FOUNDATION FIELDBUS networks), pneumatic control signal networks, or any other or additional type of network(s).

In one aspect of operation, at least one of the controllers 104a-104b represents a multivariable controller or other type of controller whose operation is to be monitored. A multivariable controller could represent a controller that controls one or more aspects of the process or production environment (via the actuators 102b), where those aspects are controlled based on multiple inputs (from the sensors 102a). As a particular example, a multivariable controller could receive pressure, temperature, and flow rate measurements from one or more sensors 102a and use the measurements to control one or more actuators 102b.

The performance of these or other controllers can often degrade over time. In accordance with this disclosure, at least one controller performance monitor 130 is provided in the process control system 100. The controller performance monitor 130 generally monitors the performance of one or more controllers 104a-104b and determines when controller maintenance (such as re-tuning) is required. The controller performance monitor 130 could represent an application executed in or other logic supported by the process control system 100, such as in one or more servers 110a-110b or operator stations 116a-116c. The controller performance monitor 130 could also represent a hardware or other module implemented as a stand-alone unit. The controller performance monitor 130 could even be implemented in a controller itself or be implemented in any other suitable manner. The controller performance monitor 130 may include any hardware, software, firmware, or combination thereof for monitoring one or more controllers.

Figure 3:
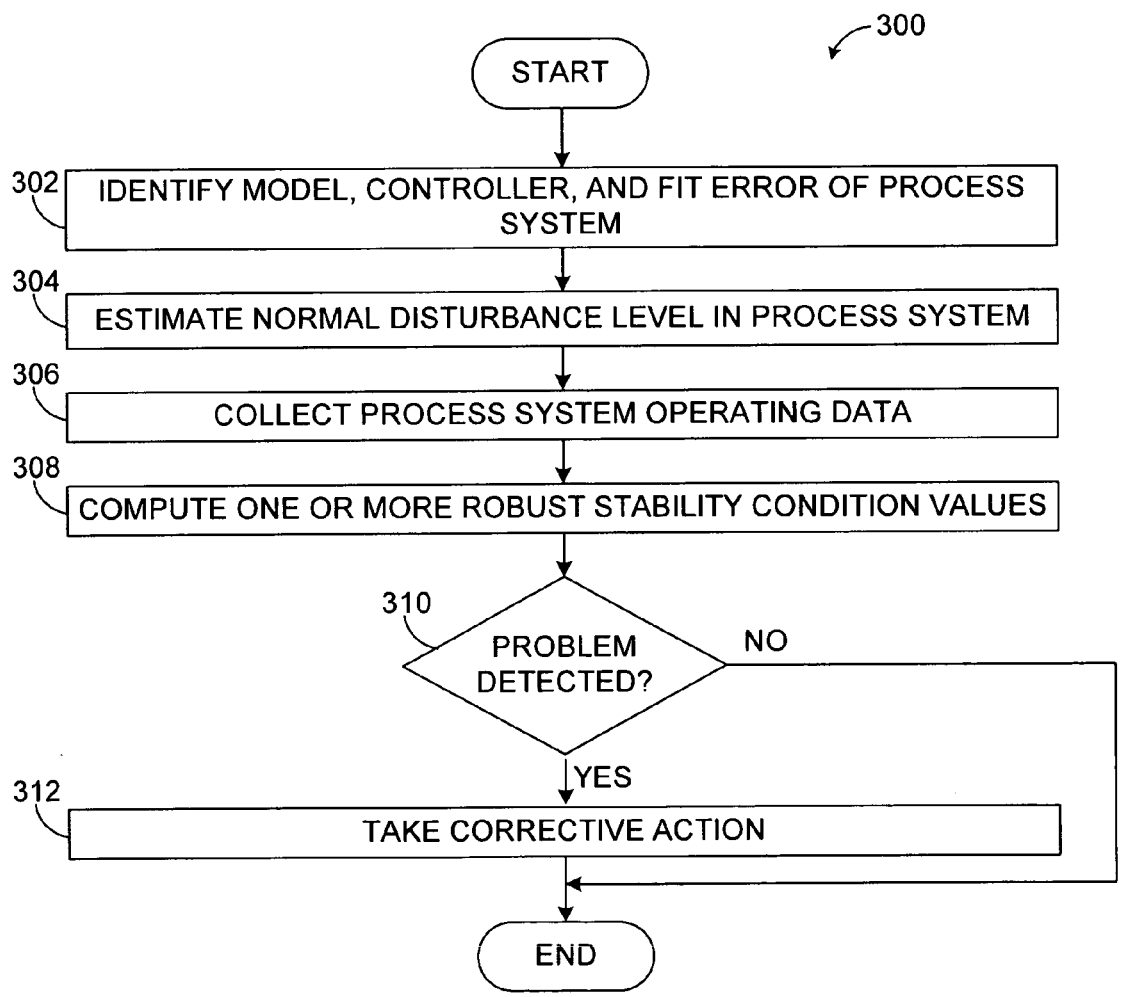
FIG. 3 illustrates an example method for controller performance monitoring in a process control system.
Figure 4A:
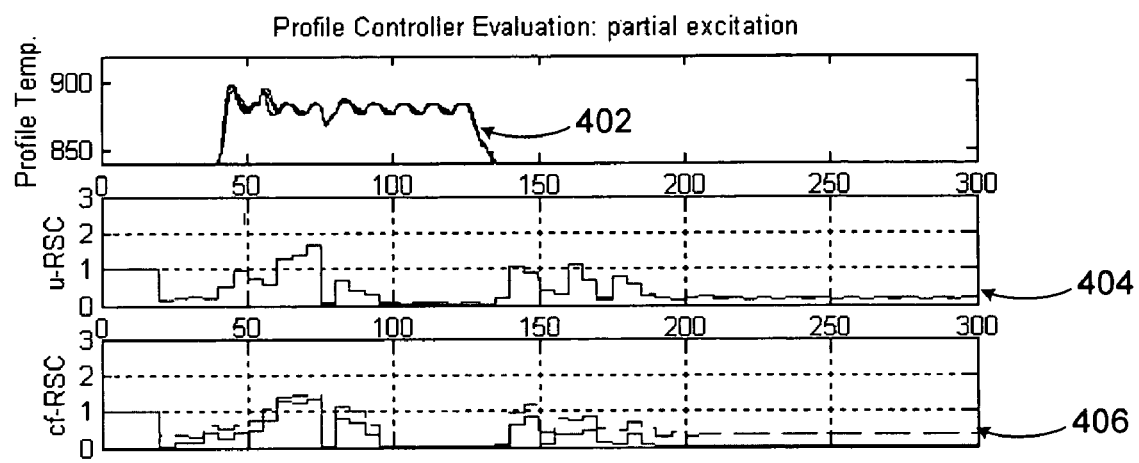
FIGS. 4A and 4B illustrate example operations of a controller performance monitor in a process control system.
Figure 4B:
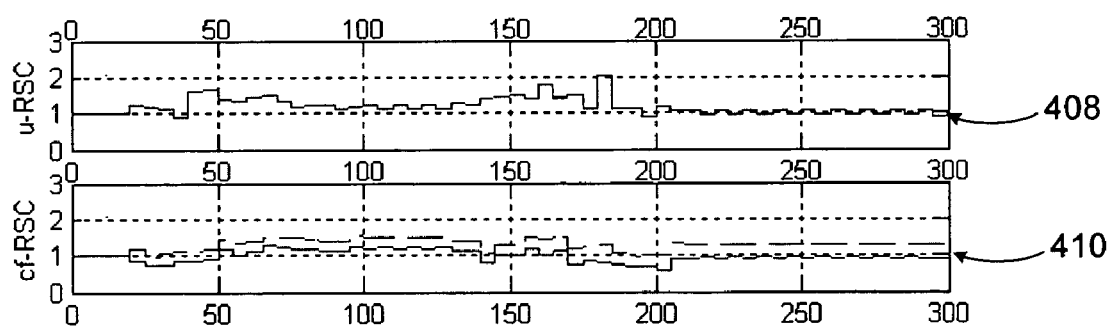

In general, the controller performance monitor 130 monitors the behavior of one or more controllers 104a-104b and identifies any controllers 104a-104b that are performing poorly. At that point, any suitable maintenance or other steps can take place, such as notifying the appropriate personnel so that re-tuning of a poorly performing controller can occur. One technique for identifying controllers that are performing poorly is shown in FIG. 3, which is described below. Example operations of the controller performance monitor 130 are shown in FIGS. 4A and 4B, which are also described below.

In some embodiments, the controller performance monitor 130 analyzes various information about a controller, such as information associated with normal operation of the controller (like sensor measurement data and actuator control signals). This may be done with or without injecting external excitation into the process control system 100, or excitation that is introduced for the purpose of testing the controller. This means that it may not be necessary to change (manually or otherwise) the normal operation of the system 100. If necessary, minor excitation can be injected into the system 100 to identify how the controllers 104a-104b respond. This minor excitation could be useful in evaluating the controllers 104a-104b without adversely affecting any products being produced in the system 100. The controller performance monitor 130 can use this information to determine if and how a controller has deviated from its nominal, normal, or expected behavior.

In particular embodiments, a process model is used to represent a process system, and related control logic is used in a controller to associate sensor measurement data with actuator control signals. The controller performance monitor 130 evaluates small gain conditions to identify one or more robust stability condition (RSC) values. A robust stability condition represents a condition for robust stability, or a condition for stability in the presence of perturbations or uncertainty in the process model. The uncertainty represents a mismatch between the actual process system and the model of the process system. Changes in the actual process system may render the process model less accurate or more uncertain, requiring re-tuning of the controller or other maintenance (such as adjustments to the control logic in the controller). In particular embodiments, the mismatch between the process system and the process model could be sensitivity-weighted. This means that less relevant mismatches (such as mismatches between high frequency or very low frequency components) are weighted less than more relevant mismatches (such as mismatches between low and intermediate frequency components).

Also, in particular embodiments, the controller performance monitor 130 can place a bound on the "normal" level of disturbances in the system 100. This may allow the controller performance monitor 130 to operate even in the presence of noise or other disturbances. In addition, the controller performance monitor 130 can support the "unfalsification" concept, meaning that the controller performance monitor 130 can only reject a controller as performing poorly (as opposed to actually determining that a controller is working properly). This may help to reduce the number of false alarms and the associated costs and interruptions associated with operation of the controller performance monitor 130.

Within this framework, process system data can be used to estimate one or more robust stability conditions and thereby indirectly estimate the uncertainty of a process model. A controller can be rejected if this uncertainty estimate reaches and remains at a large value, such as by remaining greater than a value of one for a specified time period. By considering different robust stability conditions (and therefore different descriptions of uncertainty), a family of monitoring criteria can be derived. This may provide certain benefits depending on the implementation, such as ease of computation, operation with no or mild excitation requirements, ability to work with saturating actuators 102b, and application regardless of the controller actually used in the system 100. Further, the controller performance monitor 130 may or may not require additional excitation, and poorly performing controllers can often be identified using normal operating data. However, if required, the excitation requirements are often modest compared to system identification (the amount of excitation necessary to build the process model).

In addition, the use of the "unfalsification" principle may help to alleviate problems with low signal-to-noise ratios (SNRs). In these embodiments, past data can be used to establish a normal level of perturbation or an effective SNR beyond which a controller cannot be rejected. This may be useful for avoiding false alarms during normal operations when excitation is low. With normal operating data and poor excitation, the controller performance monitor 130 could yield no conclusion (not reject the controller). Moreover, in some cases, the controller performance monitor 130 can reject controllers only when the controllers consistently fail a test for a period longer than the time needed to dissipate a process disturbance, which may also help to reduce false alarms.

In this way, the controller performance monitor 130 can more accurately identify the performance of various controllers 104a-104b in the process control system 100. Also, various implementations of the controller performance monitor 130, such as those based on controller unfalsification concepts, may provide reliable performance monitoring with fewer false alarms.

Although FIG. 1 illustrates one example of a process control system 100, various changes may be made to FIG. 1. For example, a control system could include any number of sensors, actuators, controllers, servers, operator stations, networks, and controller performance monitors. Also, the makeup and arrangement of the process control system 100 is for illustration only. Components could be added, omitted, combined, or placed in any other suitable configuration according to particular needs. In addition, FIG. 1 illustrates one operational environment in which controller performance monitoring can be used. The controller performance monitoring mechanism could be used in any other suitable device or system.

Figure 2:
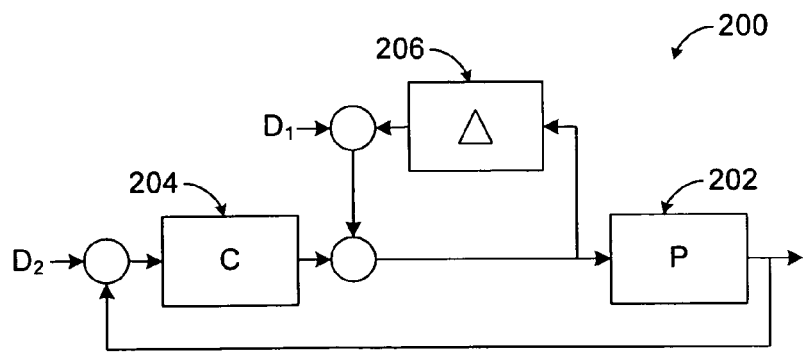
FIG. 2 illustrates an example representation of a process system associated with different robust stability conditions.

FIG. 2 illustrates an example representation 200 of a process system associated with different robust stability conditions. The embodiment of the process system representation 200 shown in FIG. 2 is for illustration only. Other process system representations could be used without departing from the scope of this disclosure. Also, for ease of explanation, the process system representation 200 is described as representing the process control system 100 of FIG. 1. The process system representation 200 could be associated with any other suitable system.

As shown in FIG. 2, a process system can be generally represented using a process model (P) 202, a controller (C) 204, and a model uncertainty ($\Delta$) 206. The process model 202 generally represents the behavior of a process system. The process model 202 could, for example, represent the step responses, frequency responses, or a set of differential equations defining how a particular process system behaves. As particular examples, the process model 202 could define how a manufacturing plant, chemical plant, crude oil refinery, or ore processing plant (or a portion thereof) behaves when different inputs are provided. The process model 202 is often generated using a "system identification," which typically refers to a large set of data representing the outputs of the process system over a wide range of inputs.

The controller 204 generally represents the control logic implemented by a controller for controlling the process system represented by the process model 202. In other words, the controller 204 generally represents the behavior of the controller in controlling the process system. The controller 204 could, for example, represent the step responses, frequency responses, or a set of differential equations defining how the controller controls one or more actuators 102b based on measurement data from one or more sensors 102a. The controller 204 is often designed or specified based on the process model 202.

The model uncertainty 206 represents additive plant or model uncertainty, indicating that there is some inherent uncertainty when estimating or defining the process model 202. The model uncertainty 206, combined with external disturbances $d_1$, often leads to a less-than-perfect representation and control of the process system. Similarly, feedback uncertainty (uncertainty in the input to the controller 204 from the process model 202) and external disturbances $d_2$ often lead to less-than-ideal operation of the controller 204.

The following represents three different examples of how the controller performance monitor 130 can monitor the performance of a controller in a process system represented in FIG. 2. Each of these techniques could be used separately or in combination with one or more other techniques.

In a first technique, the controller performance monitor 130 can monitor a small gain condition at the "plant input" (the output from the controller 204 to the process model 202) when evaluating the performance of the controller 204. For example, the controller performance monitor 130 could use the following to measure the performance of the controller 204:

$$\frac{\|S_u C[y] - T_u\| - \|d\|}{\|u\|} > RSC_{design}. \quad (1)$$

In this equation, the left-hand portion calculates a current robust stability condition value, and the right-hand value represents a robust stability condition threshold. If the current value exceeds the threshold, this indicates a possible problem with the controller 204. Here, $S_u=(I+CP)^{-1}$, $T_u=CP(I+CP)^{-1}$, C represents the controller 204, P represents the process model 202, u represents the plant input, y represents the plant output (the output of the process model 202), and d represents the contribution of bounded disturbances translated at the plant input. The notation $\|\cdot\|$ represents a value interpreted as a frequency spectrum. $RSC_{design}$ represents the maximum desired robust stability condition value, where a value above this could represent an unstable controller. In this example, a weighted plant modeling error can be represented as:

$$S_u CP_a - T_u = CS_u C(P_a - P) \quad (2)$$

where $P_a$ represents the actual process.

For linear loops (i.e. no saturating inputs) without external excitation, the value from Equation (1) may be upper bounded by a value of one. As a result, in some embodiments, $RSC_{design}$ may be set to a value of one. Any current values less than or equal to one may offer no conclusions, meaning the controller 204 is not flagged as performing poorly. Loop nonlinearity and transient effects from controller computations could make the current value become greater than one, indicating a potential problem in the controller 204. When this occurs, the controller 204 has deviated from its modeled, intended, or identified point, and the control loop behavior has become unpredictable.

To provide less or more strict monitoring of a controller 204, the value of $RSC_{design}$ may be altered. For example, a smaller value could cause the controller 204 to be rejected sooner (allowing less uncertainty or unpredictability), and a larger value could cause the controller 204 to be rejected later (allowing more uncertainty or unpredictability).

In this technique, an accurate estimate of the normal disturbance d in the process system can be useful to reduce false alarms when the SNR is low. This technique could be used regardless of the controller 204 actually used in the process system. Also, this technique may be valid even if an actuator 102b controlled by the controller 204 is saturating or if only partial excitation is present in the system.

In a second technique, the controller performance monitor 130 can monitor a small gain condition at the "plant output" (the output from the process model 202) when evaluating the performance of the controller 204. For example, the controller performance monitor 130 could use the following to measure the performance of the controller 204:

$$\frac{\|y - T_y[r]\| - \|d\|}{\|r - y\|} > RSC_{design}. \quad (3)$$

The controller 204 can be rejected if the current RSC value calculated on the left-hand side of Equation (3) exceeds the threshold value $RSC_{design}$. Here, $T_y=PC(I+PC)^{-1}$, r represents a reference signal (the desired value of y), and $\|d\|$ represents the contribution of bounded disturbances translated at the plant output.

Again, $RSC_{design}$ may be set to a value of one or to any other desired value. Any current value less than or equal to $RSC_{design}$ may offer no conclusions, while controller problems could make the current value become greater than $RSC_{design}$. In this technique, an accurate estimate of the normal disturbance d in the process system can be useful to reduce false alarms when the SNR is low. In particular embodiments, this technique may require that the same controller used to perform a system identification be used in the control loop being monitored, and this technique may be restricted to controllers controlling non-saturating actuators.

In a third technique, the controller performance monitor 130 can monitor a small gain condition in a closed-loop system using coprime factor perturbation when evaluating the performance of the controller 204. In general, the process model 202 can be expressed as $P=D^{-1}N$, where D and N are coprime factors of P. In this example, the controller performance monitor 130 could use the following to measure the performance of the controller 204:

$$\overline{\sigma}[CS_y D^{-1}]\delta_N + \overline{\sigma}[S_y D^{-1}]\delta_D > RSC_{design} \quad (4)$$

where [N,D] represents a left coprime factorization of the process model 202, e=D[y]−N[u] is the coprime factor modeling error, $\delta_N$ and $\delta_D$ represent uncertainty estimates, and $\|d\|$ represents the contribution of bounded disturbances translated at a coprime factor node. Also:

$$\delta_N = \begin{cases} \dfrac{\|e\| - \|d\|}{\|u\|} & \text{if } \ell < 1 \text{ and } \|e\| > \|d\| \\ 0 & \text{otherwise} \end{cases} \quad (5)$$

$$\delta_D = \begin{cases} \dfrac{\|e\| - \|d\|}{\|y\|} & \text{if } \ell > 1 \text{ and } \|e\| > \|d\| \\ 0 & \text{otherwise} \end{cases} \quad (6)$$

where:

$$\ell = \frac{\|y\|}{\|u\|} \cdot \frac{\overline{\sigma}[SC_y]}{\overline{\sigma}[S_y]}. \quad (7)$$

Here, $\overline{\sigma}(\bullet)$ denotes the maximum singular value.

Once again, $RSC_{design}$ may be set to a value of one or to any other desired value. Any current RSC value less than or equal to $RSC_{design}$ may offer no conclusions, while controller problems could make the current RSC value become greater than $RSC_{design}$. In this technique, an accurate estimate of the normal disturbance d in the process system can be useful to reduce false alarms when the SNR is low. Also, this technique could be used regardless of the controller 204 actually used in the process system. In addition, this technique may be valid even if an actuator 102b controlled by the controller 204 is saturating or if only partial excitation is present in the system.

Although FIG. 2 illustrates one example representation 200 of a process system associated with different robust stability conditions, various changes could be made to FIG. 2. For example, a process system could be modeled in any other suitable manner. Also, while the above description has described various techniques for calculating robust stability condition values, this has been for illustration and explanation only. Other robust stability condition calculations could be used by the controller performance monitor 130, and the controller performance monitor 130 could use any combination of these or other or additional robust stability condition values. As examples, the controller performance monitor 130 could determine and use a single robust stability condition value or multiple robust stability condition values.

FIG. 3 illustrates an example method 300 for controller performance monitoring in a process control system. The embodiment of the method 300 shown in FIG. 3 is for illustration only. Other embodiments of the method 300 could be used without departing from the scope of this disclosure. Also, for ease of explanation, the method 300 is described as being performed in the process control system 100 of FIG. 1. The method 300 could be used by any suitable device and in any suitable system.

A model, controller, and fit error associated with a process system are identified at step 302. This may include, for example, the controller performance monitor 130 or another component analyzing system identification data to identify the process model 202 and controller 204 for a process system. The fit error represents any errors made while modeling the process system, or the difference between the model 202 and the actual system.

The normal or average level of disturbance in the process system is determined at step 304. This may include, for example, the controller performance monitor 130 or another component using the fit error determined in step 302 to estimate the disturbance level $\|d\|$ in the process system. In other embodiments, such as when system identification data is unavailable, the disturbance level $\|d\|$ can be estimated using actual data from the operation of the system. In particular embodiments, the actual operating data may not contain large disturbances.

Normal operating data associated with a process system is collected at step 306. This may include, for example, the controller performance monitor 130 identifying input data provided to a controller, such as input data from one or more sensors 102a. This may also include the controller performance monitor 130 identifying output data provided by the controller, such as control signals for one or more actuators 102b. As part of this step, the controller performance monitor 130 could ensure that the operating data has an adequate SNR (such as an SNR about a threshold) and is not affected by large disturbances.

One or more robust stability condition values are calculated at step 308. This may include, for example, the controller performance monitor 130 using one or more of the techniques described above (such as Equations (1), (3), or (4)) to determine current RSC values. In some embodiments, the RSC values may be normalized and scale independent. In particular embodiments, the controller performance monitor 130 calculates two RSC values (for each technique used). One value represents a conservative estimate, where no disturbances are subtracted (the value of $\|d\|$ is set to zero). Another value represents an optimistic or unfalsified estimate, where the disturbances are subtracted (the value of $\|d\|$ is non-zero when disturbances are present).

A determination is made as to whether any problems with the controller are detected at step 310. This may include, for example, the controller performance monitor 130 comparing the calculated RSC values to one or more threshold values, such as $RSC_{design}$. In particular embodiments, no problems may be detected when the optimistic RSC value is less than $RSC_{design}$. If the optimistic RSC value is somewhat greater than $RSC_{design}$ (such as less than two when $RSC_{design}$ equals one), this may indicate that the controller is operating differently from nominal but is not operating too poorly. If the optimistic RSC value is much greater than one (such as greater than two), this may indicate that the controller is performing poorly and requires maintenance.

Similarly, in particular embodiments, no problems may be detected when the conservative RSC value is less than $RSC_{design}$ and the SNR of the operating data is high. If the conservative RSC value is much greater than one (such as greater than two) and the SNR of the data is high, this may indicate that the controller is performing poorly and requires maintenance. In this way, the controller is not rejected when there is too much interference (low SNR) in the operating data.

If no problems are detected, the method 300 may end. Otherwise, if the controller performance monitor 130 determines that a controller is performing poorly and requires maintenance, the controller performance monitor 130 takes corrective action at step 312. This may include, for example, the controller performance monitor 130 notifying the appropriate department or personnel of the controller's performance. At that point, any suitable action may take place, such as replacing the controller or re-tuning the controller.

Although FIG. 3 illustrates one example of a method 300 for controller performance monitoring in a process control system, various changes may be made to FIG. 3. For example, while shown as a series of steps, the steps in FIG. 3 could overlap or occur in parallel.

FIGS. 4A and 4B illustrate example operations of a controller performance monitor in a process control system. For ease of explanation, the example operations shown in FIGS. 4A and 4B are described with respect to the controller performance monitor 130 operating in the process control system 100 of FIG. 1. The example operations shown in FIGS. 4A and 4B are for illustration only. The controller performance monitor 130 could operate in any other suitable manner.

As shown in FIG. 4A, line 402 represents the temperature inside a diffusion furnace used to fabricate integrated circuits. The line 402 moves up and down slightly, which indicates that the temperature inside the diffusion furnace was manually excited by a small amount (such as ±5° C.). This level of manual excitation is less than the level of excitation normally required for system identification.

In this example, line 404 represents the RSC values calculated using Equation (1) based on plant input. Line 404 represents the RSC values calculated using Equation (4) based on coprime factor perturbation. As shown in this example, both lines 404-406 occasionally exceed an $RSC_{design}$ value of one but never exceed a value of two. This indicates that while the controller occasionally strays from nominal behavior, the controller overall is performing well.

In FIG. 4B, lines 408-410 represent the RSC values calculated using Equations (1) and (4) for a different controller. As shown in this example, both lines 408-410 routinely exceed an $RSC_{design}$ value of one, and line 408 exceeds a value of two at one point. This indicates that the controller routinely strays from nominal behavior and overall is performing quite poorly. This controller may therefore be flagged by the controller performance monitor 130 as requiring maintenance.

Although FIGS. 4A and 4B illustrate example operations of a controller performance monitor 130 in a process control system, various changes may be made to FIGS. 4A and 4B. For example, while values of one and two are used as thresholds in these examples, any other or additional threshold values could be used to determine the performance of a controller.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one memory operable to store operating data associated with operation of a process system; and
   at least one processor operable to:
      determine a level of disturbance associated with the process system;
      determine first and second values identifying stability measures of a controller in the process system using the operating data, the at least one processor operable to determine the first value using the determined level of disturbance and to determine the second value using a zero level of disturbance;
      compare the first and second values to at least one threshold value; and
      identify a problem with the controller when at least one of:
         the first value exceeds the at least one threshold value; and
         the second value exceeds the at least one threshold value while a signal-to-noise ratio (SNR) associated with the operating data is better than an SNR threshold.

2. The apparatus of claim 1, wherein at least one of the first and second values is associated with an uncertainty estimate of a process model, the process model representing at least a portion of the process system.

3. The apparatus of claim 2, wherein:
   the at least one processor is operable to determine the level of disturbance associated with the process system using system identification data; and
   the process model comprises a process model generated using the system identification data.

4. The apparatus of claim 2, wherein at least one of the first and second values is based on at least one of: an output signal generated by the controller, an input signal received by the controller, and the uncertainty estimate associated with the process model.

5. The apparatus of claim 1, wherein the at least one threshold value comprises a single threshold value equal to one.

6. The apparatus of claim 1, wherein the at least one processor is operable to identify the problem with the controller without requiring injection of external excitation in the process system.

7. The apparatus of claim 1, wherein the at least one processor is operable to identify the problem with the controller even when an actuator controlled by the controller is saturated.

8. The apparatus of claim 1, wherein:
   at least one of the first and second values is associated with an uncertainty estimate of a process model, the process model representing at least a portion of the process system;

the process model comprises a process model generated using system identification data; and the at least one processor is operable to identify the problem with the controller even when the controller was not used to generate the system identification data.

9. The apparatus of claim 1, wherein:

the process system comprises a product production system;

the operating data comprises at least one of:
measurement data from one or more sensors; and
control data for one or more actuators; and the controller comprises a multivariable controller operable to receive the measurement data and generate the control data.

10. A method, comprising:

determining a level of disturbance associated with a process system;

determining first and second values identifying stability measures of a controller in the process system using operating data associated with operation of the process system, the first value determined using the determined level of disturbance, the second value determined using a zero level of disturbance;

comparing the first and second values to at least one threshold value; and identifying a problem with the controller when at least one of:
the first value exceeds the at least one threshold value; and
the second value exceeds the at least one threshold value while a signal-to-noise ratio (SNR) associated with the operating data is better than an SNR threshold.

11. The method of claim 10, wherein at least one of the first and second values is associated with an uncertainty estimate of a process model, the process model representing at least a portion of the process system.

12. The method of claim 11, wherein:

the level of disturbance associated with the process system is determined using system identification data; and further comprising generating the process model using the system identification data.

13. The method of claim 11, wherein at least one of the first and second values is based on at least one of: an output signal generated by the controller, an input signal received by the controller, and the uncertainty estimate associated with the process model.

14. The method of claim 10, wherein identifying the problem with the controller:

occurs without injecting external excitation in the process system; and occurs even when an actuator controlled by the controller is saturated.

15. The method of claim 10, wherein:

at least one of the first and second values is associated with an uncertainty estimate of a process model, the process model representing at least a portion of the process system;

the process model is generated using system identification data; and identifying the problem with the controller comprises identifying the problem with the controller even when the controller was not used to generate the system identification data.

16. The method of claim 10, further comprising:

replacing or re-tuning the controller in response to the identified problem.

17. A computer readable storage medium embodying a computer program, the computer program comprising computer readable program code for:

determining a level of disturbance associated with a process system;

determining first and second values identifying stability measures of a controller in the process system using operating data associated with operation of the process system, the first value determined using the determined level of disturbance, the second value determined using a zero level of disturbance;

comparing the first and second values to at least one threshold value; and identifying a problem with the controller when at least one of:
the first value exceeds the at least one threshold value; and
the second value exceeds the at least one threshold value while a signal-to-noise ratio (SNR) associated with the operating data is better than an SNR threshold.

18. The computer readable storage medium of claim 17, wherein:

at least one of the first and second values is associated with an uncertainty estimate of a process model, the process model representing at least a portion of the process system;

the computer readable program code for determining the level of disturbance comprises computer readable program code for determining the level of disturbance using system identification data; and the computer program further comprises computer readable program code for generating the process model using the system identification data.

19. The computer readable storage medium of claim 18, wherein the computer readable program code for determining the first and second values comprises computer readable program code for determining the first and second values based on at least one of: an output signal generated by the controller, an input signal received by the controller, and the uncertainty estimate associated with the process model.

20. The computer readable storage medium of claim 17, wherein the at least one threshold value comprises a single threshold value equal to one.

* * * * *